United States Patent [19]

Borbas et al.

[11] Patent Number: 5,456,605
[45] Date of Patent: Oct. 10, 1995

[54] TELEPHONE TRAINING APPARATUS AND METHOD

[75] Inventors: William F. Borbas, Woodridge; Edward A. Pekol, Lisle; David A. Rogala, Tinley Park, all of Ill.

[73] Assignee: The Board Room Inc., Romeoville, Ill.

[21] Appl. No.: 170,393

[22] Filed: Dec. 20, 1993

[51] Int. Cl.⁶ .................................................. G09B 19/00
[52] U.S. Cl. ........................ 434/111; 434/219; 434/307 R
[58] Field of Search .............................. 434/111, 307 R, 434/219, 379

[56] References Cited

U.S. PATENT DOCUMENTS

| 2,973,586 | 3/1961 | Robertson . |
| 3,878,623 | 4/1975 | Leff . |
| 3,964,179 | 6/1976 | Bennett . |
| 4,267,646 | 5/1981 | Hagwell . |
| 4,604,064 | 8/1986 | Boehm et al. . |
| 4,682,957 | 7/1987 | Young .................................. 434/307 R |
| 4,866,764 | 9/1989 | Barker, III . |
| 5,173,052 | 12/1992 | Duncan, Jr. . |

Primary Examiner—Richard J. Apley
Assistant Examiner—Glenn E. Richman
Attorney, Agent, or Firm—Willian Brinks Hofer Gilson & Lione

[57] ABSTRACT

A telephone training device to be operated by children or someone without a working knowledge of telephones, uses at least one working telephone, and a memory to store a first set of numbers, a receiver to accept a second set of numbers, a comparator to compare the second set of numbers to the first set of numbers, and a tone generator. The tone generator generates one tone when the handset is removed from the telephone, a second tone when the second set of numbers is different from the first set of numbers, and a third tone when the second set of numbers is the same as the first set of numbers.

14 Claims, 5 Drawing Sheets

TELEPHONE TRAINING APPARATUS AND METHOD

A portion of the disclosure of this patent document contains material which is subject to copyright protection. The copyright owner has no objection to the facsimile reproduction by any one of the patent disclosure, as it appears in the Patent and Trademark Office patent files or records, but otherwise reserves all copyright rights whatsoever.

BACKGROUND OF THE INVENTION

The present invention relates to a training device and method and more particularly the present invention relates to a training device and method for instructing children on the proper use of a telephone.

There are many ways to teach the proper use of a particular device such as a telephone, for example, an audio instruction tape, a video tutorial, or a manual. However, instructions on the use of the device are easier to understand and easier to remember when the training instructions are accompanied by a hands-on use of the actual device. This use or simulation provides the child or trainee with actual situations thereby minimizing the differences encountered when a child uses the actual device. Any problems that may occur during the use of the actual device, are more likely to present themselves, and be solved, if an actual device is utilized during the training session.

Accordingly, teaching a child the correct use of a telephone is better accomplished when the training session incorporates the use of a real telephone. Training sessions closely resembling actual telephone usage, will better facilitate the transition to actual telephone use. Such simulation should not only use an actual telephone, but should approximate the actual environment that a telephone user would encounter. Thus, such simulation should include dial tones, busy signals, ringing signals and communication.

Previous inventions relating to telephone training devices have fallen short in an attempt to fully simulate the actual use of a telephone. For example, U.S. Pat. No. 4,267,646 issued to Hagwell discloses a modified telephone whereby lights are used to indicate when each correct number is dialed. Due to the modifications, Hagwell's telephone is physically different from an actual telephone. Hagwell's telephone indicates to the trainee when each correct number is dialed by illuminating a separate light for each number. However, during the actual use of a telephone, the user does not receive this same feedback. Thus, the Hagwell telephone does not simulate the conditions encountered when a user dials a telephone. The trainee may therefore, become confused when using an actual telephone. Also, the costs to modify an existing telephone can be expensive.

U.S. Pat. No. 2,973,586 issued to Robertson discloses a telephone system for teaching the use of a dial-equipped telephone. Robertson's invention allows an operator to send ringing signals, dial tones and busy signals to the trainees in order to allow the trainee to practice operating a telephone (answering and talking). However, Robertson's invention does not allow the trainee to practice dialing the telephone and also does not allow the trainee to receive the feedback normally present in actual telephone usage. Therefore, the trainee is not practicing telephone usage in a proper simulated environment.

Therefore, it is an object of this invention to provide a telephone training device and method for instructing children on the proper use of a telephone.

It is another object of this invention to provide a telephone training device which incorporates an actual telephone that has not been modified.

It is still another object of this invention to provide a telephone training device which simulates the actual use of a telephone by generating busy signals, dial tones and ringing signals similar to those encountered from an actual telephone.

SUMMARY OF THE INVENTION

The present invention relates to a telephone training device to be operated by children or someone without a working knowledge of telephones. The child or trainee will become proficient in the use of a telephone by practicing on the telephone training device. The training device works in conjunction with one or two actual telephones, however, there is no connection to an existing telephone network. Once a telephone is connected to the training device, a set of numbers can be entered into the programmable storage device via the telephone keypad. The trainee must then dial the correct set of numbers that has been stored in the programmable storage device. The trainee will receive an audible feedback during the training session. A ringing signal indicates a correct dialing of the set of numbers while an incorrect dialing will generate a busy signal.

If only one telephone is utilized, the trainee will receive an audible feedback to inform the trainee whether a correct number was dialed. If two telephones are used during the training session, once the trainee dials the correct set of numbers a ringing signal is obtained, and the instructor can lift the handset of the instructor's telephone and communicate with the trainee.

BRIEF DESCRIPTION OF THE DRAWINGS

Preferred embodiments of the invention are explained below with reference to the accompanying drawings in which.

DESCRIPTION OF THE PREFERRED EMBODIMENT

Figure 1:
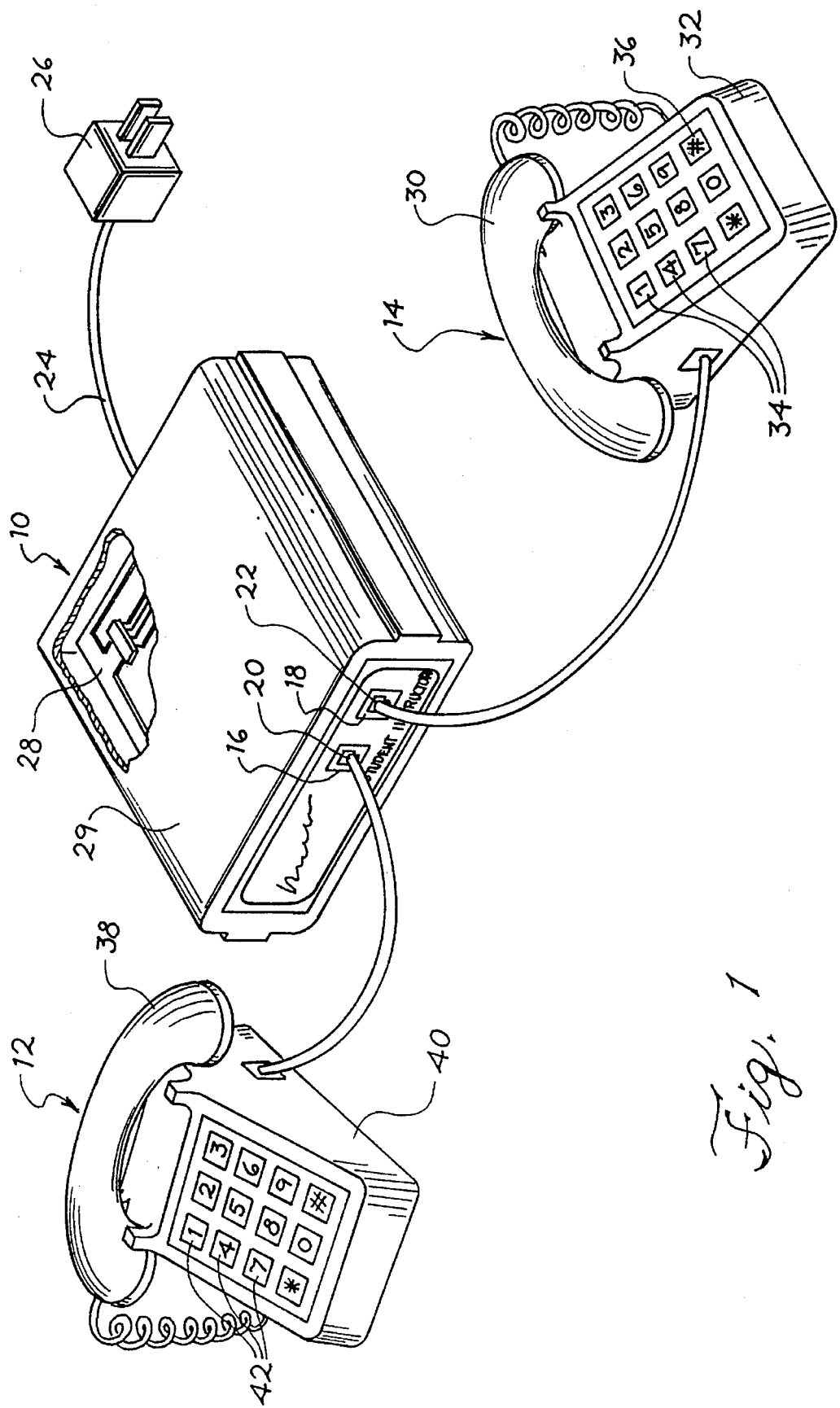
FIG. 1 shows a perspective view of a telephone training device according to an embodiment of the present invention with two telephones connected.

Referring to FIG. 1 there is depicted a perspective view of a telephone training device 10 according to a first preferred embodiment of the present invention. The telephone training device 10 is designed to be used independent of existing telephone networks. Therefore, there is no need to connect the telephone training device 10 to a telephone network, for example, the telephone network provided by American Telephone and Telegraph.

The telephone training device 10 is designed to be used in conjunction with two telephones 12, 14. The telephone training device 10 is designed to be compact and portable such that it is easily moveable from one location to another. The telephone training device 10 includes two input/output (I/O) connectors 16, 18 whereby the two telephones 12, 14 can be connected via their respective connectors 20, 22. The I/O connectors 16, 18 are basic female connectors such as RJ-11 connectors commonly used in the telephone industry. Connectors 20, 22 are the male counterparts to I/O connectors 16, 18. Once connected, the I/O connectors 16, 18 will allow audible signals to pass from each telephone 12, 14 to the telephone training device 10 and back, and also, if necessary, through to the other telephone 14, 12. The audible signals include voice, keyboard tones, busy signals, ringing signals and dial tones (including a 480 HZ tone), as will be explained subsequently.

The telephone training device 10 also includes a power cord 24 and attached converter 26 which is plugged into a power source during usage (for example, 60 Hz, 120 volts), which supplies power to the telephone training device 10.

The telephone training device 10 also includes a printed circuit board 28 which houses certain electrical components (for example, resistors, capacitors, a DTMF receiver, a microcomputer, etc.) (not shown) necessary to operate the telephone training device 10. The printed circuit board 28 is protected by a plastic casing 29.

A brief description of the operation of the system of the present invention is given here in order to better understand the descriptions of the hardware and software which follows. To begin operation of the telephone training device the two telephones 12, 14 are plugged into the I/O connectors 16, 18 and the transformer 26 is plugged into a power source, such as a wall outlet (not shown). The instructor removes the handset 30 of the instructor's telephone 14 from its base 32 (the handset is taken off-hook). The telephone training device 10 now enters the learning mode and a 480 hz dial tone is generated at the instructors handset 30. The instructor then enters a set of numbers by depressing the associated keys 34 on the base of the telephone 32. When the instructor has finished entering the set of numbers he depresses the "#" key 36, signifying that the last number of the set of numbers has been entered. Then the instructor places his handset 30 back on the base of the telephone 32. The set of numbers is now stored in the telephone training device 10. The set of numbers may correspond to a telephone number, for example, the student's home telephone number, information (411), etc. When power is first applied to the telephone training device 10, a default number (911) is stored for comparison.

Next, the student removes the handset 38 off the base of his telephone 40, thus taking the handset 38 off-hook. The telephone training device now enters the operational mode, and a dial tone will be heard at the student's handset 38. The student may now begin entering a set of numbers by depressing the keys 42 on the base of the students telephone 40. If the student enters the correct set of numbers (the same set that the instructor entered) then the student will hear a ringing signal at his handset 38. The instructor can then take the handset 30 of the instructor's telephone 14 off-hook and communicate with the student. If, however, the student enters the wrong set of numbers the student will hear a busy signal at his handset 38 signifying an incorrect set of numbers was dialed. The student must then place his handset 38 on-hook and start over.

Figure 2:
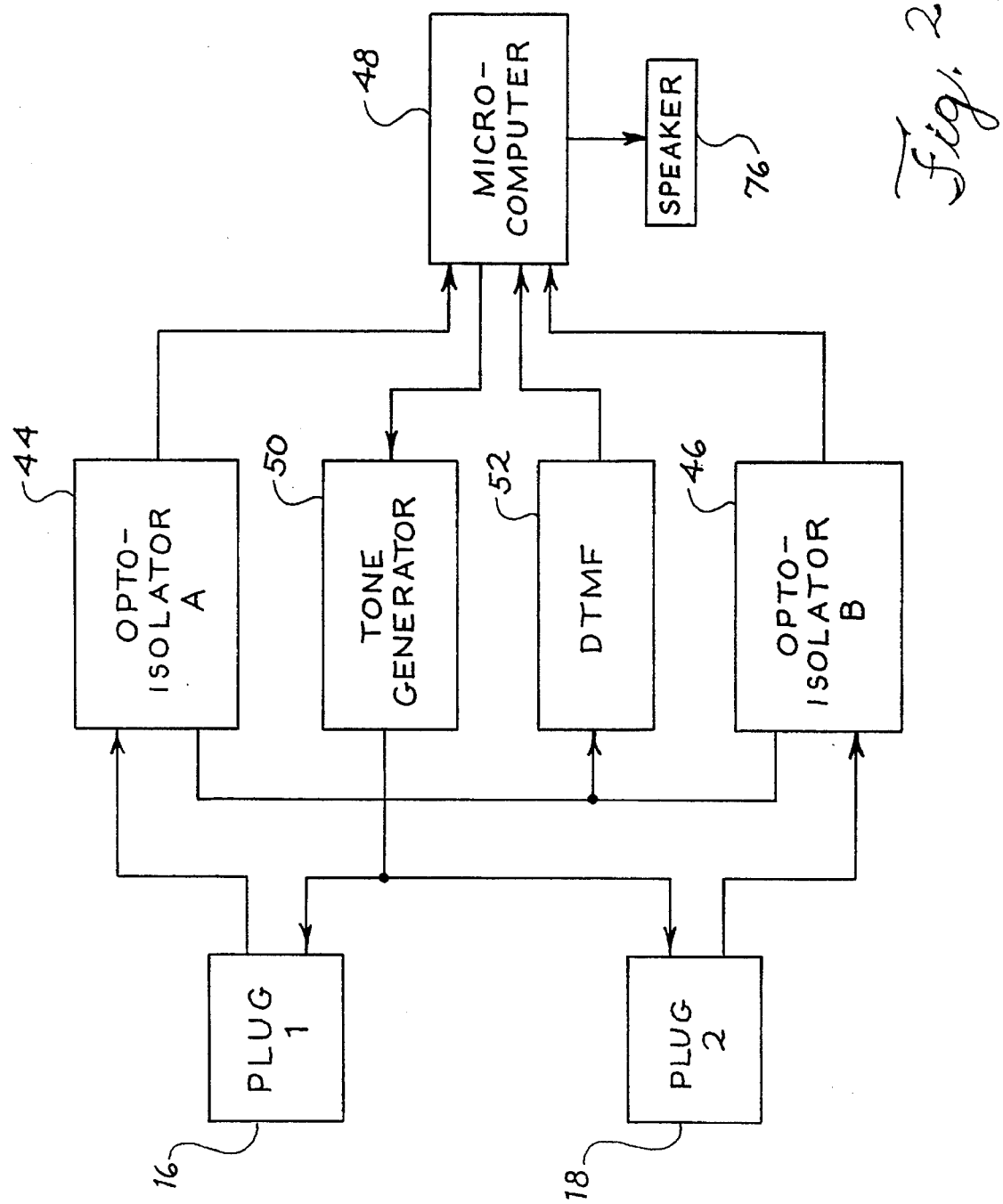
FIG. 2 is a functional block diagram illustrating an embodiment of the invention.

FIG. 2 shows a functional block diagram of the printed circuit board 28 located inside the telephone training device 10. Plug 1 is the I/O connector 16 from FIG. 1, while plug 2 is the I/O connector 18. As described above, these I/O connectors 16, 18 are the interface between the telephones 12, 14 and the telephone training device 10. They pass all of the important data to and from the telephones 12, 14 thereby transmitting all of the data to the student or instructor.

During operation of the telephone training device 10, if either of the handsets 30, 38 are removed from the base of their respective telephones 32, 40 an opto-isolator 44, 46 is triggered. If the student takes his handset 38 off-hook, opto-isolator A 44 is triggered thereby signalling the microcomputer 48, such as the Motorola MC68HC705C8 Microcontroller, that the telephone training device 10 is in its operational state. If however, the instructor lifts his handset 30 from the base of the telephone 32, opto-isolator B 46 is triggered, thereby signalling the microcomputer 48 that the telephone training device 10 is in the learning mode.

When student's handset 38 is taken off-hook the microcomputer 48 sends the proper signal to a tone generator 50, such as the Teltone M-991 Call Progress Tone Generator, which generates a dial tone at plug 1 16. The student will then hear a dial tone at his handset 38 similar to when a handset is removed from an actual telephone.

As the student enters a set of numbers by depressing the keys 42 on the base of the telephone 40, the data is passed to a dual-tone multiple-frequency (DTMF) receiver 52, such as the Teltone M-8870 DTMF Receiver. The DTMF receiver 52 processes the data and transmits a 4-bit decoded tone output to the microcomputer 48 which will compare the data transmitted from the DTMF receiver 52 to that stored in the microcomputer memory. If the data transmitted to the microcomputer 48 is not the same as that stored in memory, the microcomputer 48 transmits a signal to the tone generator 50. The tone generator 50 then sends a busy signal to plug 1 16 and thus to the student. If, instead, the data transmitted to the microcomputer 48 matches, the microcomputer 48 waits for the next number. When all the numbers have correctly been entered, the microcomputer 48 transmits a signal to the tone generator 50 which in turn sends a ringing signal to the student's telephone 12. The microcomputer 48 also sends a signal to the external speaker 76 such that an audible ringing sound is heard. At this time the instructor can take his handset 30 off-hook and communicate with the student.

When the instructor takes his handset 30 off-hook prior to the student taking his handset 38 off-hook, the telephone training device 10 enters the learning mode. The instructor can enter a set of numbers by depressing the keys 34 on the base of his telephone 32. This information is transmitted through plug 2 18 to the DTMF receiver 52, decoded and sent to the microcomputer 48 where it is stored. When the microcomputer 48 receives a decoded input corresponding to the "#" key the microcomputer will 48 will stop storing data.

Figure 3A:
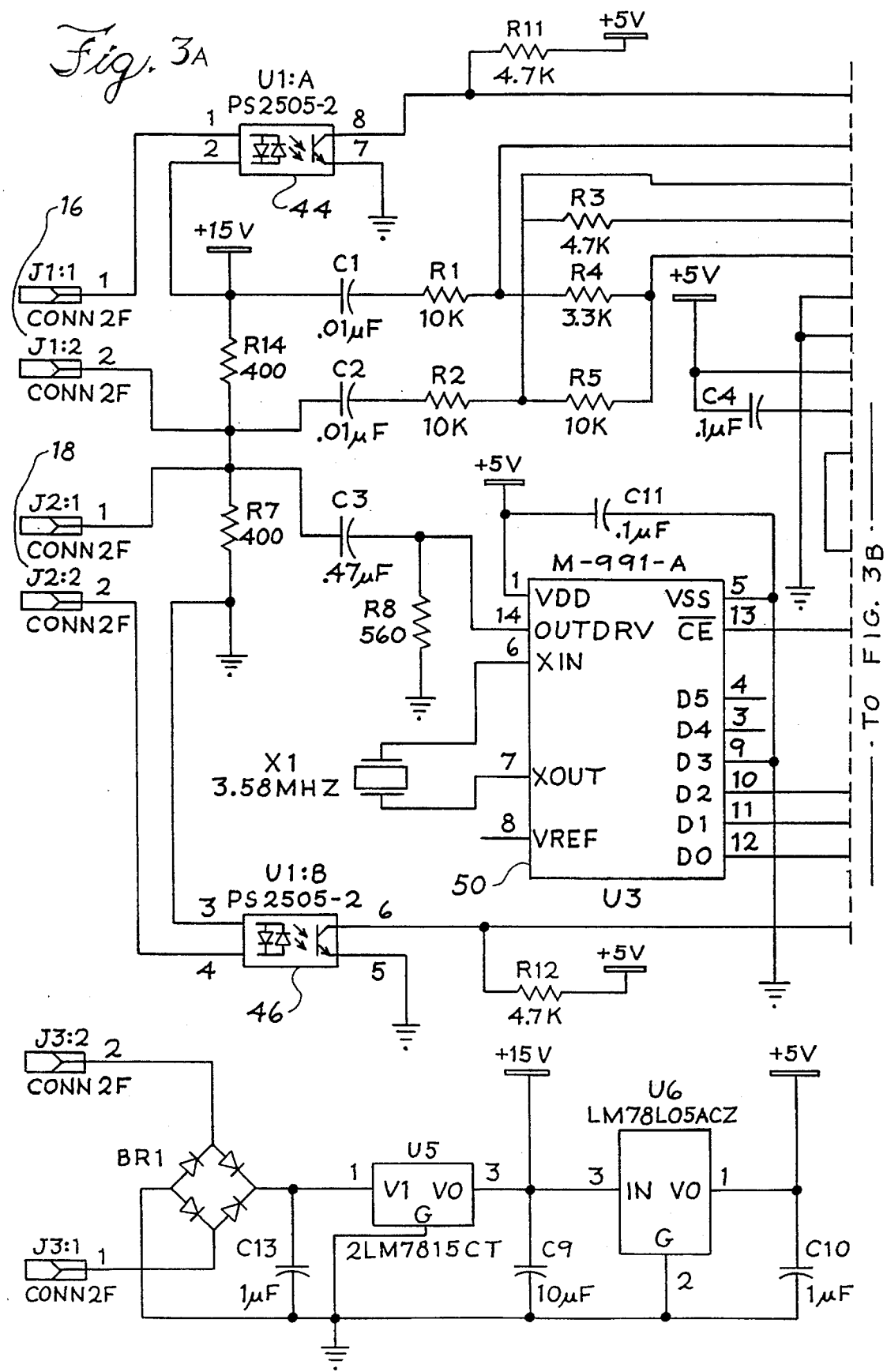
FIG. 3 shows an electrical schematic of an embodiment of a printed circuit board which may be used in the telephone training device of FIG. 1.
Figure 3B:
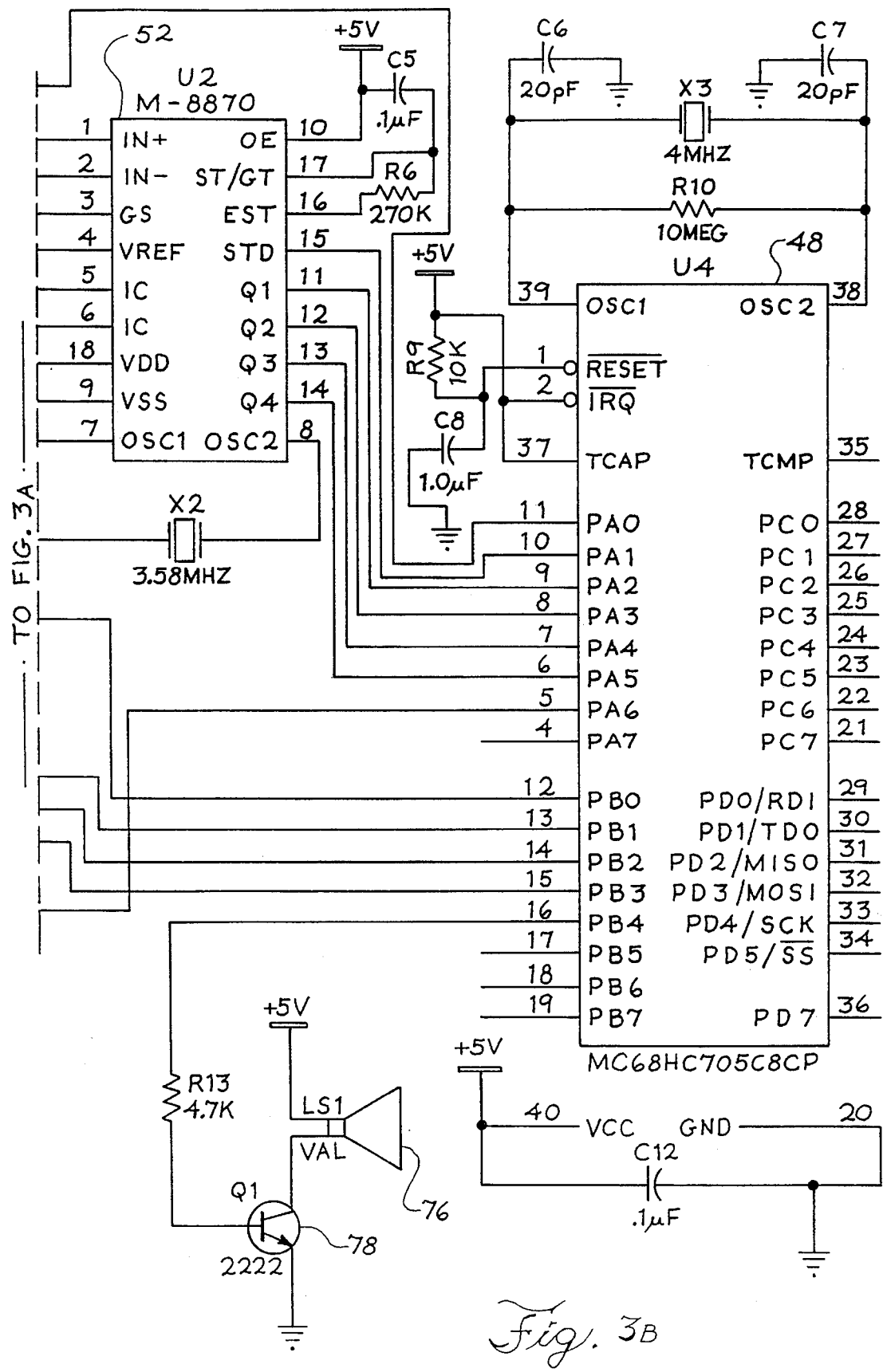

FIG. 3 shows the schematic diagram for a preferred embodiment of the printed circuit board 28 found inside the telephone training device 10.

Plug 1 16 is represented in the schematic by J1. Pin 1 of J1 16 is connected to pin 1 of opto-isolator A 44. Pin 8 of opto-isolator A 44 is connected to pin 11 (PAØ) of the microcomputer 48. Thus, when the student takes his handset 38 off-hook opto-isolator A 44 is triggered, sending a signal to the microcomputer 48 through the PAØ line. Opto-isolator A 44 also is connected via pin 2 to the DTMF receiver 52 at pin 1, while pin 2 of J1 16 is connected to the DTMF receiver 52 at pin 2. These connections are the inputs from the students telephone 12 to the DTMF receiver 52. When the student enters a number from the base of his telephone 40 the data will be transmitted to the DTMF receiver 52 where it will be decoded and transmitted to the microcomputer 48. The transmission of the decoded data from DTMF receiver 52 to microcomputer 48 takes place from the output pins 11–14 ($Q_1$–$Q_4$) of the DTMF receiver 52, to the input pins 6–9 (PA5–PA2) of the microcomputer 48. Once received by the microcomputer 48 on the input pins 6–9, the microcomputer 48 can store the data or compare the data depending on which mode the telephone training device 10 is in, the learning mode or the operational mode.

The microcomputer 48 uses three of its B port pins as output drivers to control the tone generator 50. Pins 13–15 (PB1–PB3) of microcomputer 48 are connected to input pins 10–12 (D2–D0) of the tone generator 50. The tone generator 50 will, depending on the signal sent from the microcomputer 48, produce either a dial tone, a busy signal, a ringing signal, or a 480 hz dial tone (signifies to the instructor that telephone training device 10 is in the learning mode). The tone generator 50 generates a tone at pin 14 (OUTDRV) which is connected to both J1 16 (pin 2) and J2 18 (pin 1). Thus, the generated tone will be sent through connectors J1 and J2 16, 18 to the telephones 12, 14 where either the student or the instructor will receive them.

Similar to the operation of connector J1 16, is connector J2 18, the instructor's telephone 14 interface to the telephone training device 10. Pin 2 of J2 18 is connected to pin 4 of opto-isolator B 46. Pin 6 of opto-isolator B 46 is connected to the microcomputer 48 at its pin 5 (PA6). When the handset 30 is removed from the base of the instructor's telephone 32, opto-isolator B 46 is triggered thereby signalling the microcomputer that the handset 30 has been taken off-hook. Pin 1 of connector J2 18 is connected to the DTMF receiver 52 at pin 2 (IN–). In accordance with this design, when the instructor enters a key from the base of his telephone 32 the DTMF receiver 52 will receive the tone and convert the signal into a 4-bit tone decoded output. The data will be transmitted to the microcomputer 48 as described above. The operation of the tone generator 50 and the transmission of the tone has also been described above.

Finally, a speaker 76 is connected via output pin 16 (PB4) of the microcomputer 48. When the student dials the correct set of numbers, the microcomputer 48 also sends an output pulse at pin 16 (PB4) thereby turning on transistor Q1 78 which turns on the speaker 76. This will further simulate the actual use of a telephone by incorporating an external ringing sound when the correct set of numbers is dialed.

Also shown in FIG. 3 are various discrete components such as resistors, capacitors and crystals. These components are chosen based on the integrated circuit they support and their use is known to persons skilled in the art.

Figure 4:
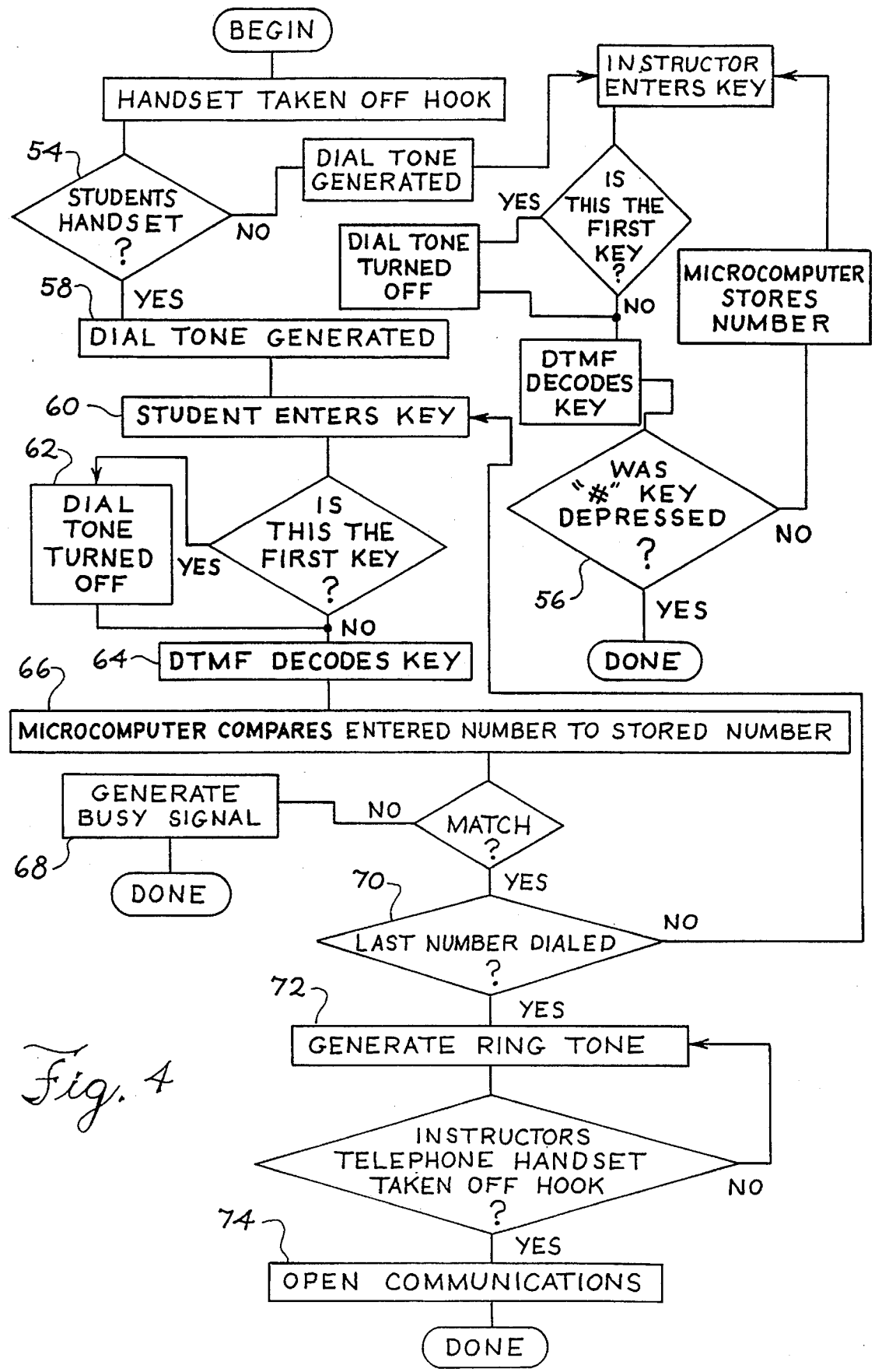
FIG. 4 shows a flow chart of a microcomputer program which may be used to control the microcomputer of the telephone training device of FIG. 1.

FIG. 4 shows a flow chart of the program that may be used to control the microcomputer 48. The program, written in Assembler language, is listed in the Appendix to this specification. The program begins when both handsets 30, 38 are on-hook. One of the handsets is taken off-hook. The microcomputer 48 must determine which handset was taken off-hook 54. If the instructor's handset 30 was taken off-hook, the program generates a special dial tone at the instructor's handset 30 and enters the learning mode. The instructor must enter a set of numbers to be stored in the microcomputer 48. When finished, the instructor enters the "#" key 56 and the microcomputer 48 is then programmed with a new set of numbers. If instead the student takes his handset 38 off hook 54 then the microcomputer 48 enters the operational state. After generating a dial tone 58, the student begins entering keys 60. When the first key is entered the dial tone is turned off 62. After the DTMF receiver decodes the data 64, the microcomputer 48 compares the data to that stored in memory 66. If there is no match a busy signal is generated 68. However if there is a match and the last number has been dialed 70 a ringing signal is generated 72. When the instructor takes his handset 30 off-hook communications between the student and the instructor are opened 74.

It can be readily seen that an alternative embodiment of the invention is created by using only one telephone. The same telephone will be used in both the learning mode and the operational mode. The only difference in operation is that when the correct set of numbers are entered a ringing signal will be generated, however no communications between the student and the instructor can be opened.

It is intended that the foregoing detailed description be regarded as illustrative rather than limiting and that it is understood that the following claims including all equivalents are intended to define the scope of the invention.
v,1-18/2

We claim:

1. A telephone training apparatus comprising:

a first telephone;

a second telephone;

a store for storing a first set of numbers received from said first telephone, said store being independent of any direct connection to a telephone network;

a receiver for accepting a second set of numbers from said second telephone;

a comparator for comparing each number of said second set of numbers to each number of said first set of numbers stored in said store;

a tone generator, controlled by said comparator, for generating a first tone when a handset of said second telephone is removed from said second telephone, said tone generator generating a second tone after entire said second set of numbers is generated if any number of said second set of numbers is different from the corresponding number of said first set of numbers, and said tone generator for generating a third tone if said second set of numbers is the same as said first set of numbers; and a reset device, enabled by placing said handset back on said telephone, for resetting the comparator after a tone is generated.

2. The telephone training apparatus as claimed in claim 1, wherein the receiver for accepting said second set of numbers from said second telephone comprises a DTMF receiver.

3. The telephone training apparatus as claimed in claim 1, wherein the store for storing said first set of numbers, and the comparator for comparing said second set of numbers to said first set of numbers, comprises a microcomputer.

4. The telephone training apparatus as claimed in claim 1, wherein said first tone is similar to a dial tone, said second tone is similar to a busy tone, and said third tone is similar to a ringing tone generated during actual use of a telephone.

5. The telephone training apparatus as claimed in claim 1, wherein said reset device for resetting the comparison device comprises an opto-isolator.

6. The telephone training apparatus as claimed in claim 1, wherein the apparatus further comprises a speaker for supplying an audible ring when the correct set of numbers are dialed.

7. The telephone training apparatus as claimed in claim 1, wherein the tone generator further generates a fourth tone when a handset of said first telephone is removed from said first telephone prior to the removal of a handset of said second telephone from said second telephone.

8. The telephone training apparatus as claimed in claim 1, wherein the receiver further accepts said first set of numbers and transmits said first set of numbers to said store to be stored.

9. The telephone training apparatus as claimed in claim 1, wherein said first telephone and said second telephone are a single telephone.

10. A telephone training apparatus comprising:

a telephone;

a storage device for storing a first set of numbers received from said telephone, said storage device being independent of any direct connection to a telephone network;

a receiving device for accepting a second set of numbers from said telephone;

a comparison device for comparing said second set of numbers to said first set of numbers in said storage device;

a tone generating device, controlled by said comparison device, for generating a first tone when a handset of said second telephone is removed from said second telephone, said tone generating device generating a second tone after entire said second set of numbers is entered if any number of said second set of numbers is different from the corresponding number of said first set of numbers, and said tone generating device for generating a third tone if said second set of numbers is the same as said first set of numbers; and a reset device, enabled by placing said handset back on said telephone, for resetting the comparison device after a tone is generated.

11. A telephone training apparatus incorporating a first telephone and a second telephone for transmitting signals and receiving tones, comprising:

a decoder for decoding a first set of numbers and a second set of numbers received from either said first telephone or said second telephone or from both said first and second telephones;

a microcomputer, independent of any direct connection to a telephone network, for receiving said decoded signals from said decoder and either storing said decoded signals or comparing said decoded signals to previously stored decoded signals, and for resetting said telephone training apparatus when a handset of said second telephone is placed back on said second telephone;

a tone generator, controlled by said microcomputer, for generating a first tone when said handset of said second telephone is removed from said second telephone, said tone generator generating a second tone after entire said second set of numbers is entered if any number of said second set of numbers is different from the corresponding number of said first set of numbers, and said tone generator for generating a third tone if said second set of numbers is the same as said first set of numbers.

12. The telephone training apparatus as claimed in claim 11, wherein the decoder for decoding signals received from either said first or second telephone comprises a DTMF receiver.

13. A telephone training method for teaching the proper use of a telephone, comprising the steps of:

connecting a first telephone to a telephone training apparatus via a first connector, said telephone training apparatus being independent of any direct connectors to a telephone network;

connecting a second telephone to the telephone training apparatus via a second connector;

entering a first set of numbers into a programmable storage device via the second telephone;

entering a second set of numbers via the first telephone;

comparing the first set of numbers to the second set of numbers;

generating a first tone if the first set of numbers is the same as the second set of numbers, and generating a second tone if the first set of numbers is not the same as the second set of numbers.

14. A telephone training apparatus comprising:

a first telephone;

a second telephone;

a store for storing a first set of numbers received from said first telephone, said store being independent of any direct connection to a telephone network;

a receiver for accepting a second set of numbers from said second telephone;

a comparator for comparing each number of said second set of numbers to each number of said first set of numbers stored in said store; and a tone generator, controlled by said comparator, for generating a dial tone when a handset of said second telephone is removed from said second telephone, said tone generator generating a busy tone after entire second set of numbers is entered if any number of said second set of numbers is different from the corresponding number of said first set of numbers, and said tone generator for generating a ringing tone if said second set of numbers is the same as said first set of numbers; and a reset device, enabled by placing said handset back on said telephone, for resetting the comparator after a tone is generated.

* * * * *